United States Patent
Iida et al.

(10) Patent No.: US 11,539,079 B2
(45) Date of Patent: *Dec. 27, 2022

(54) NONAQUEOUS ELECTROLYTE AND NONAQUEOUS ELECTROLYTE SECONDARY BATTERY

(71) Applicant: Panasonic Intellectual Property Management Co., Ltd., Osaka (JP)

(72) Inventors: Kazuhiro Iida, Tokyo (JP); Takanobu Chiga, Osaka (JP); Naoya Morisawa, Hyogo (JP); Atsushi Fukui, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 401 days.

This patent is subject to a terminal disclaimer.

(21) Appl. No.: 16/580,194

(22) Filed: Sep. 24, 2019

(65) Prior Publication Data
US 2020/0020985 A1    Jan. 16, 2020

Related U.S. Application Data

(63) Continuation of application No. PCT/JP2018/004358, filed on Feb. 8, 2018.

(30) Foreign Application Priority Data

Mar. 29, 2017    (JP) .............................. JP2017-064107

(51) Int. Cl.
*H01M 10/0569* (2010.01)
*H01M 10/052* (2010.01)
*H01M 6/16* (2006.01)

(52) U.S. Cl.
CPC ....... *H01M 10/0569* (2013.01); *H01M 6/164* (2013.01); *H01M 10/052* (2013.01); *H01M 2300/004* (2013.01)

(58) Field of Classification Search
CPC . H01M 10/0569; H01M 10/052; H01M 6/164
See application file for complete search history.

(56) References Cited

U.S. PATENT DOCUMENTS

2003/0165733 A1* 9/2003 Takehara .......... H01M 10/0569
    429/101
2009/0325065 A1   12/2009 Fujii et al.
(Continued)

FOREIGN PATENT DOCUMENTS

JP    2007-299541 A    11/2007
JP    2009-289414 A    12/2009
(Continued)

OTHER PUBLICATIONS

International Search Report dated Apr. 24, 2018, issued in counterpart Application No. PCT/JP2018/004358 (2 pages).
(Continued)

*Primary Examiner* — Osei K Amponsah
(74) *Attorney, Agent, or Firm* — WHDA, LLP

(57) ABSTRACT

A nonaqueous electrolyte includes a lithium salt and a nonaqueous solvent in which the lithium salt is dissolved. The nonaqueous solvent includes a fluorinated chain carboxylate ester and a dicarbonyl compound having two carbonyl groups in the molecule. The dicarbonyl compound is at least one selected from the group consisting of esters and acid anhydrides and has not more than three atoms between the two carbonyl groups.

11 Claims, 1 Drawing Sheet

(56) References Cited

U.S. PATENT DOCUMENTS

| | | |
|---|---|---|
| 2010/0081062 A1 | 4/2010 | Chiga et al. |
| 2011/0183218 A1* | 7/2011 | Odani ............... H01M 10/4235 |
| | | 429/342 |
| 2017/0040649 A1 | 2/2017 | Schmitz et al. |

FOREIGN PATENT DOCUMENTS

| | | |
|---|---|---|
| JP | 2011-233535 A | 11/2011 |
| JP | 2015-69704 A | 4/2015 |
| JP | 2017-152222 A | 8/2017 |
| JP | 2017-208186 A | 11/2017 |
| JP | 2017-224410 A | 12/2017 |
| WO | 2015/158755 A1 | 10/2015 |

OTHER PUBLICATIONS

English Translation of Search Report dated Nov. 3, 2021, issued in counterpart CN Application No. 201880014568.5. (3 pages).

* cited by examiner

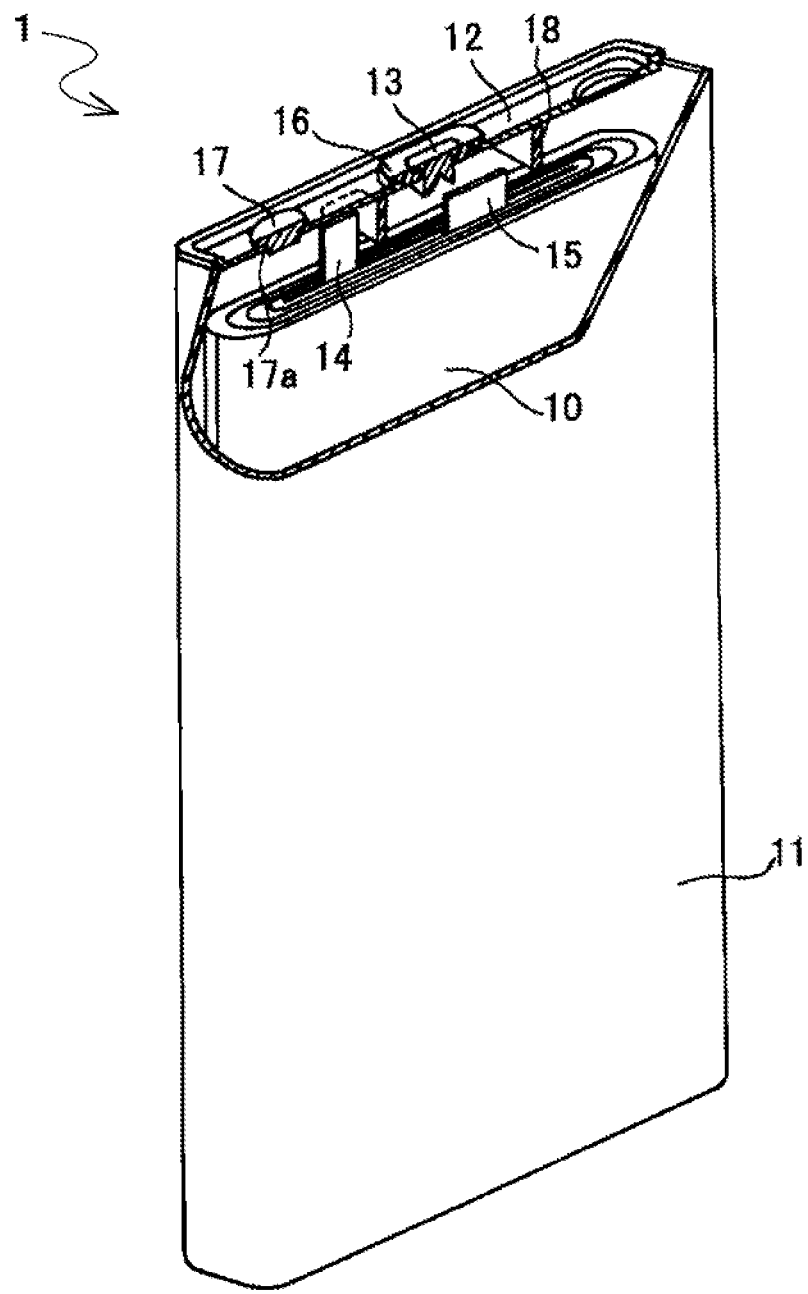

NONAQUEOUS ELECTROLYTE AND NONAQUEOUS ELECTROLYTE SECONDARY BATTERY

TECHNICAL FIELD

The present invention relates to an improvement of nonaqueous electrolyte in nonaqueous electrolyte secondary batteries.

BACKGROUND ART

In nonaqueous electrolyte secondary batteries represented by lithium ion secondary batteries, an irreversible reaction occurs in a nonaqueous electrolyte between a nonaqueous solvent and part of a lithium salt during charging and discharging. In light of this fact, it is proposed to use a fluorinated chain carboxylate ester as a nonaqueous solvent in order to prevent the oxidative decomposition of the nonaqueous solvent on the positive electrode (Patent Literature 1).

CITATION LIST

Patent Literature

PTL 1: Japanese Published Unexamined Patent Application No. 2009-289414

SUMMARY OF INVENTION

Fluorinated chain carboxylate esters are excellent in oxidation resistance but can be reductively decomposed on a negative electrode in a fully charged state. In particular, the reductive decomposition of a fluorinated carboxylate ester on a negative electrode proceeds when a fully charged battery is stored at a high temperature, often causing a decrease in battery capacity.

In light of the above problems, an aspect of the present invention resides in a nonaqueous electrolyte including a lithium salt and a nonaqueous solvent in which the lithium salt is dissolved, wherein the nonaqueous solvent includes a fluorinated chain carboxylate ester and a dicarbonyl compound having two carbonyl groups in the molecule, and the dicarbonyl compound is at least one selected from the group consisting of esters and acid anhydrides and has not more than three atoms between the two carbonyl groups.

Another aspect of the present invention resides in a nonaqueous electrolyte secondary battery including the above nonaqueous electrolyte, a positive electrode and a negative electrode, the positive electrode including a lithium transition metal oxide.

The nonaqueous electrolyte according to the present invention includes a fluorinated chain carboxylate ester as a nonaqueous solvent, but can still offer a small decrease in capacity of a nonaqueous electrolyte secondary battery even when stored at a high temperature.

BRIEF DESCRIPTION OF DRAWING

FIG. 1 is a partially cutout perspective view of a nonaqueous electrolyte secondary battery according to an embodiment of the present invention.

DESCRIPTION OF EMBODIMENTS

A nonaqueous electrolyte according to an embodiment of the present invention includes a lithium salt and a nonaqueous solvent in which the lithium salt is dissolved. The nonaqueous solvent includes a fluorinated chain carboxylate ester and a dicarbonyl compound having two carbonyl groups in the molecule. The dicarbonyl compound is at least one selected from the group consisting of esters and acid anhydrides and has not more than three atoms between the two carbonyl groups.

During the charging and discharging process, the dicarbonyl compound and the fluorinated chain carboxylate ester react together to form a lithium ion permeable film on the surface of the negative electrode active material. On the negative electrode, the fluorinated chain carboxylate ester receives electrons and becomes radical species, which react with the dicarbonyl compound. The reaction product (for example, a chain fluorinated dicarbonyl compound such as, for example, 4-hydroxy-4-(3,3,3-trifluoropropanoyloxy)-2-butenoic acid) accumulates on the surface of the negative electrode active material to form a film. The film covering the surface of the negative electrode active material suppresses the reductive decomposition of the fluorinated chain carboxylate ester.

With the mechanism described above which involves the dicarbonyl compound, a charged battery attains a small decrease in capacity due to the reductive decomposition of the fluorinated chain carboxylate ester on the negative electrode during high-temperature storage. That is, the high-temperature storage characteristics of a battery can be enhanced in spite of the fluorinated chain carboxylate ester being included in the nonaqueous solvent.

The reaction between the dicarbonyl compound and the fluorinated chain carboxylate ester during the charging and discharging process also forms a lithium ion permeable film on the surface of the positive electrode active material.

When the positive electrode active material is a Ni-containing lithium transition metal oxide, alkali components (such as LiOH and $LiCO_3$) derived from raw materials tend to remain as unreacted components on the positive electrode active material. On the positive electrode, such alkali components tend to cause the decomposition of the fluorinated chain carboxylate ester. As a result of the addition of the dicarbonyl compound to the nonaqueous electrolyte including the fluorinated chain carboxylate ester, the reaction which occurs on the positive electrode will be between the reaction intermediate of the fluorinated chain carboxylate ester being decomposed by the alkali components, and the dicarbonyl compound. The resultant reaction product (for example, a chain fluorinated dicarbonyl compound) accumulates on the surface of the positive electrode active material to form a film. The film covering the surface of the positive electrode active material suppresses the excessive decomposition of the fluorinated chain carboxylate ester by the alkali components.

(Dicarbonyl Compounds)

The dicarbonyl compound is at least one selected from the group consisting of esters and acid anhydrides, and has not more than three atoms (for example, carbon atoms or oxygen atoms) between the two carbonyl groups. For example, three carbon atoms may be present between the two carbonyl groups; or two carbon atoms may be present between the two carbonyl groups, and one oxygen atom may be present between the two carbon atoms. If more than three atoms are present between the two carbonyl groups, the films formed on the surface of the active materials become less stable and may fail to prevent the decomposition of the fluorinated chain carboxylate ester.

Some preferred esters are oxalate esters, malonate esters, succinate esters, glutarate esters and diglycolate esters. The esters may be monoesters or diesters. In particular, succinate diesters such as dimethyl succinate are more preferable. To suppress the decomposition of the fluorinated chain carboxylate ester more effectively, dicarbonyl esters having a chain molecular structure are preferable.

Some preferred acid anhydrides are succinic anhydride, glutaric anhydride and diglycolic anhydride, with diglycolic anhydride being more preferable.

The dicarbonyl compounds may be used singly, or two or more may be used in combination.

The content of the dicarbonyl compound in the nonaqueous electrolyte is preferably not less than 0.1 mass % and less than 2.0 mass %, and more preferably not less than 0.5 mass % and not more than 1.5 mass %. When this content is satisfied, the high-temperature storage characteristics of batteries may be further enhanced while maintaining a high initial capacity. The content of the dicarbonyl compound in the nonaqueous electrolyte is the mass proportion of the dicarbonyl compound in the nonaqueous electrolyte (excluding additives described later).

(Fluorinated Chain Carboxylate Esters)

To attain enhancements in the high-temperature storage characteristics of batteries, the fluorinated chain carboxylate ester(s) preferably includes at least one selected from the group consisting of methyl 3,3,3-trifluoropropionate (FMP) and 2,2,2-trifluoroethyl acetate (FEA). The fluorinated chain carboxylate ester is more preferably FMP, and still more preferably a combination of FMP and FEA.

Other fluorinated chain carboxylate esters such as ethyl trifluoroacetate and ethyl difluoroacetate may also be used.

The content of the fluorinated chain carboxylate ester in the nonaqueous solvent is preferably not less than 20 vol % and not more than 90 vol %, and more preferably not less than 60 vol % and not more than 90 vol %. When this content is satisfied, the high-temperature storage characteristics of batteries may be further enhanced while maintaining a high initial capacity. The content of the fluorinated chain carboxylate ester in the nonaqueous solvent is the volume proportion of the fluorinated chain carboxylate ester in the nonaqueous solvent (excluding the dicarbonyl compounds described above, and additives described later).

The amounts of the dicarbonyl compound and the fluorinated chain carboxylate ester contained in the nonaqueous electrolyte may be determined by, for example, nuclear magnetic resonance (NMR) spectroscopy or gas chromatography-mass spectroscopy (GC/MS).

(Nonaqueous Solvents)

In addition to the fluorinated chain carboxylate ester and the dicarbonyl compound, the nonaqueous solvent may include, for example, cyclic carbonates such as propylene carbonate (PC) and ethylene carbonate (EC); chain carbonates such as diethyl carbonate (DEC), ethyl methyl carbonate (EMC) and dimethyl carbonate (DMC); lactones such as γ-butyrolactone (GBL) and γ-valerolactone; and cyclic carboxylate esters. These solvents may be used singly, or two or more may be used in combination. For the reason that high ion conductivity is obtained, in particular, cyclic carbonates are preferable. PC is particularly preferable because of low freezing point. In particular, PC may be suitably used in combination with a fluorinated cyclic carbonate such as fluoroethylene carbonate (FEC). This combined use is advantageous in that the nonaqueous electrolyte can maintain high ion conductivity even when the fluorinated cyclic carbonate becomes scarce after repeated charging and discharging. For example, the proportion of PC in the nonaqueous electrolyte is preferably 1 to 30 mass %, and more preferably 2 to 20 mass %.

To improve the charge discharge characteristics of batteries, additives may be added to the nonaqueous solvent. Examples of such additives include vinylene carbonate (VC) and vinyl ethylene carbonate.

As an additive to the nonaqueous solvent, it is preferable to use at least one of an organic chlorine compound and a halogenated dicarbonyl compound. The organic chlorine compound preferably has a structure represented by the general formula: $CF_3CH_2CO$—$CClR_1R_2$ (wherein $R_1$ and $R_2$ are each independently a hydrogen atom, a halogen atom, a C1-C2 alkyl group or a C1-C2 haloalkyl group). Examples of the organic chlorine compounds include 1-chloro-1,4,4,4-tetrafluorobutan-2-one. Examples of the halogenated dicarbonyl compounds include tetrafluorosuccinic anhydride, dimethyl tetrafluorosuccinate and dimethyl fluoromalonate.

The organic chlorine compound and the halogenated dicarbonyl compound have high reactivity with respect to the alkali components. These compounds preferentially react with the alkali components over the fluorinated chain carboxylate ester and thereby suppress the excessive decomposition of the fluorinated chain carboxylate ester by the alkali components. Further, during the charging and discharging process, at least one of the organic chlorine compound and the halogenated dicarbonyl compound takes part in the formation of a film on the active material surface together with the fluorinated chain carboxylate ester and the dicarbonyl compound. As a result, the film comes to contain more halogen and thereby attains enhanced lithium ion permeability. For example, the film includes a halogenated chain dicarbonyl compound.

The additives for the nonaqueous solvent may be used singly, or two or more may be used in combination. The content of the additives in the nonaqueous electrolyte is, for example, 0.01 to 15 mass %, and may be 0.05 to 10 mass %. The content of the additives in the nonaqueous electrolyte is the mass proportion of the additives in the nonaqueous electrolyte (excluding the dicarbonyl compounds).

(Lithium Salts)

Examples of the lithium salts include $LiPF_6$, $LiBF_4$, $LiClO_4$, $LiAsF_6$, $LiCF_3SO_3$, and imide salts such as LiFSI ($LiN(SO_2F)_2$) and LiTFSI ($LiN(SO_2CF_3)_2$). The lithium salts may be used singly, or two or more may be used in combination. To attain enhancements in the lithium ion conductivity of the nonaqueous electrolyte, in particular, the lithium salt(s) preferably includes at least one selected from the group consisting of $LiPF_6$, LiFSI and LiTFSI. The combination of $LiPF_6$ and LiFSI, or the combination of $LiPF_6$ and LiTFSI is more preferable. When, in particular, LiFSI or LiTFSI is used, the imide species which is the counter anion will be incorporated into the film formed by the reaction of the dicarbonyl compound and the fluorinated chain carboxylate ester to offer enhancements in lithium ion conductivity.

The concentration of the lithium salt in the nonaqueous electrolyte is, for example, 0.5 to 2 mol/L.

A nonaqueous electrolyte secondary battery according to an embodiment of the present invention includes the nonaqueous electrolyte described hereinabove, a positive electrode and a negative electrode. By the use of the nonaqueous electrolyte, the battery attains enhanced high-temperature storage characteristics.

(Positive Electrodes)

For example, the positive electrode includes a positive electrode current collector and a positive electrode mixture layer disposed on the surface of the positive electrode current collector. The positive electrode mixture layer may be formed by applying a positive electrode slurry which is a dispersion of a positive electrode mixture in a dispersion medium, onto the surface of a positive electrode current collector, and drying the wet film. Where necessary, the dried film may be rolled. The positive electrode mixture layer may be formed on one or both sides of the positive electrode current collector. The positive electrode mixture essentially includes a positive electrode active material, and may optionally contain other components such as a binder, a conductive agent and a thickener.

The positive electrode active material may be, for example, a lithium transition metal oxide. Examples of the lithium transition metal oxides include $Li_aM_bO_c$, $LiMPO_4$ and $Li_2MPO_4F$. Here, M is at least one selected from the group consisting of Na, Mg, Sc, Y, Mn, Fe, Co, Ni, Cu, Zn, Al, Cr, Pb, Sb, Ti, Nb, Zr, W, Ta, Mo and B, a=0-1.2, b=0.1-1.0, and c=2.0-4.0. Incidentally, the letter a which indicates the molar ratio of lithium is the value immediately after the preparation of the active material, and changes after charging and discharging.

To attain an increase in capacity, it is preferable that 80 mol % or more of the transition metal(s) contained in the lithium transition metal oxide be Ni. In a Ni-containing lithium transition metal oxide, alkali components derived from raw materials tend to remain. However, by the use of the above-described nonaqueous electrolyte including the dicarbonyl compound, the decomposition of the fluorinated chain carboxylate ester by the alkali components is suppressed. When the Ni proportion in the transition metals in the lithium transition metal oxide is 80 mol % or more, the battery can markedly benefit from the effective suppression of the decomposition of the fluorinated chain carboxylate ester by the alkali components.

Examples of the binders include resin materials, for example, fluororesins such as polytetrafluoroethylene and polyvinylidene fluoride (PVDF); polyolefin resins such as polyethylene and polypropylene; polyamide resins such as aramid resin; polyimide resins such as polyimide and polyamide-imide; acrylic resins such as polyacrylic acid, polymethyl acrylate and ethylene-acrylic acid copolymer; vinyl resins such as polyacrylonitrile and polyvinyl acetate; polyvinylpyrrolidone; polyether sulfone; and rubbery materials such as styrene-butadiene copolymer rubber (SBR). The binders may be used singly, or two or more may be used in combination.

Examples of the conductive agents include graphites such as natural graphite and artificial graphite; carbon blacks such as acetylene black; conductive fibers such as carbon fibers and metal fibers; carbon fluoride; metal powders such as aluminum; conductive whiskers such as zinc oxide and potassium titanate; conductive metal oxides such as titanium oxide; and organic conductive materials such as phenylene derivatives. The conductive agents may be used singly, or two or more may be used in combination.

Examples of the thickeners include cellulose derivatives (for example, cellulose ethers) such as carboxymethylcellulose (CMC) and modified products thereof (including salts such as Na salt), and methyl cellulose; saponification products of polymers having vinyl acetate units, such as polyvinyl alcohols; and polyethers (for example, polyalkylene oxides such as polyethylene oxide). The thickeners may be used singly, or two or more may be used in combination.

Examples of the positive electrode current collectors include nonporous conductive substrates (such as metal foils) and porous conductive substrates (such as meshes, nets and punched sheets). Examples of the materials of the positive electrode current collectors include stainless steel, aluminum, aluminum alloys and titanium. For example, the thickness of the positive electrode current collector is, although not particularly limited to, 3 to 50 μm.

The dispersion medium is not particularly limited. Examples thereof include water, alcohols such as ethanol, ethers such as tetrahydrofuran, amides such as dimethylformamide, N-methyl-2-pyrrolidone (NMP), and mixtures of these solvents.

(Negative Electrodes)

For example, the negative electrode includes a negative electrode current collector and a negative electrode mixture layer disposed on the surface of the negative electrode current collector. The negative electrode mixture layer may be formed by applying a negative electrode slurry which is a dispersion of a negative electrode mixture in a dispersion medium, onto the surface of a negative electrode current collector, and drying the wet film. Where necessary, the dried film may be rolled. The negative electrode mixture layer may be formed on one or both sides of the negative electrode current collector. The negative electrode mixture essentially includes a negative electrode active material, and may optionally contain other components such as a binder, a conductive agent and a thickener. Examples of the binders, of the thickeners and of the dispersion media are the same as those described with respect to the positive electrode. Examples of the conductive agents are similar to those described with respect to the positive electrode, except that the graphites are excluded.

Examples of the negative electrode active materials include carbon materials, silicon, silicon compounds such as silicon oxides, and lithium alloys containing at least one selected from the group consisting of tin, aluminum, zinc and magnesium. Examples of the carbon materials include graphites (such as natural graphite and artificial graphite) and amorphous carbons.

Examples of the negative electrode current collectors include nonporous conductive substrates (such as metal foils) and porous conductive substrates (such as meshes, nets and punched sheets). Examples of the materials of the negative electrode current collectors include stainless steel, nickel, nickel alloys, copper and copper alloys. The thickness of the negative electrode current collector is not particularly limited, but is preferably 1 to 50 μm, and more preferably 5 to 20 μm from the point of view of the balance between negative electrode strength and weight reduction.

For example, the nonaqueous electrolyte secondary battery may have a structure in which the positive electrode and the negative electrode are wound together via a separator to form an electrode assembly, and the electrode assembly and the nonaqueous electrolyte are accommodated in an exterior case. The wound electrode assembly may be replaced by other form of an electrode assembly, such as a stacked electrode assembly in which the positive electrodes and the negative electrodes are stacked on top of one another via separators. For example, the nonaqueous electrolyte secondary battery may be a cylindrical battery, a prismatic battery, a coin-shaped battery, a button-shaped battery, a laminate battery, or the like.

(Separators)

It is usually desirable that a separator be disposed between the positive electrode and the negative electrode. The separator has high ion permeability, and has appropriate mechanical strength and insulating properties. Examples of the separators include microporous thin films, woven fabrics and nonwoven fabrics. Preferred separator materials are polyolefins such as polypropylene and polyethylene.

Hereinbelow, the constituent elements except the negative electrode will be described in detail with respect to a prismatic wound battery as an example. However, the types, shapes and other configurations of the nonaqueous electrolyte secondary batteries are not particularly limited.

FIG. 1 is a perspective view schematically illustrating a prismatic nonaqueous electrolyte secondary battery according to an embodiment of the present invention. In FIG. 1, the nonaqueous electrolyte secondary battery 1 is partly cut to show the main constituents. A prismatic battery case 11 accommodates a flat wound electrode assembly 10 and the nonaqueous electrolyte (not shown) described hereinabove.

The electrode assembly 10 includes a sheet-shaped positive electrode and a sheet-shaped negative electrode which are wound together via a separator disposed between the positive electrode and the negative electrode. In the electrode assembly 10, one end of a positive electrode lead 14 is connected to a positive electrode current collector of the positive electrode. The other end of the positive electrode lead 14 is connected to a sealing plate 12 which serves as a positive electrode terminal. One end of a negative electrode lead 15 is connected to a negative electrode current collector, and the other end of the negative electrode lead 15 is connected to a negative electrode terminal 13 disposed substantially in the center of the sealing plate 12. A gasket 16 is disposed between the sealing plate 12 and the negative electrode terminal 13 to electrically isolate them from each other. A frame 18 made of an insulating material is disposed between the sealing plate 12 and the electrode assembly 10 to electrically isolate the negative electrode lead 15 and the sealing plate 12 from each other. The sealing plate 12 is joined to the open end of the prismatic battery case 11 to seal the prismatic battery case 11. The sealing plate 12 has an injection hole 17a. The nonaqueous electrolyte is poured into the prismatic battery case 11 through the injection hole 17a. After the pouring, the injection hole 17a is closed with a plug 17.

EXAMPLES

Hereinbelow, the present invention will be described in detail based on EXAMPLES and COMPARATIVE EXAMPLES. However, it should be construed that the scope of the present invention is not limited to such EXAMPLES.

Example 1

(1) Fabrication of Positive Electrode $LiNi_{0.82}Co_{0.15}Al_{0.03}O_2$ as a positive electrode active material, acetylene black and polyvinylidene fluoride were mixed together in a mass ratio of 100:1:0.9. N-methyl-2-pyrrolidone (NMP) was added. The resultant mixture was stirred with use of a mixer (T.K. HIVIS MIX manufactured by Primix) to give a positive electrode slurry. The positive electrode slurry was applied to the surface of an aluminum foil. The wet films were dried and rolled. Thus, a positive electrode was fabricated which had positive electrode mixture layers with a density of 3.6 g/cm³ on both sides of the aluminum foil.

(2) Fabrication of Negative Electrode

Graphite powder (average particle size: 20 μm), carboxymethylcellulose sodium (CMC-Na) and styrene-butadiene rubber (SBR) were mixed together in a mass ratio of 100:1:1. Water was added. The resultant mixture was stirred with use of a mixer (T.K. HIVIS MIX manufactured by Primix) to give a negative electrode slurry. The negative electrode slurry was applied to the surface of a copper foil. The wet films were dried and rolled. Thus, a negative electrode was fabricated which had negative electrode mixture layers with a density of 1.7 g/cm³ on both sides of the copper foil.

(3) Preparation of Nonaqueous Electrolyte

A mixed solvent was prepared which included fluoroethylene carbonate (FEC), propylene carbonate (PC), methyl 3,3,3-trifluoropropionate (FMP) and 2,2,2-trifluoroethyl acetate (FEA) in a volume ratio of 15:5:40:40. $LiPF_6$ was dissolved into the mixed solvent with a concentration of 1.0 mol/L. A nonaqueous electrolyte was thus prepared. Further, dimethyl succinate (D-SUC) as a dicarbonyl compound, 1-chloro-1,4,4,4-tetrafluorobutan-2-one (CTFB) as an organic chlorine compound, and vinylene carbonate (VC) were added to the nonaqueous electrolyte. The content of D-SUC in the nonaqueous electrolyte was 0.5 mass %. The content of CTFB in the nonaqueous electrolyte was 0.015 mass %. The content of VC in the nonaqueous electrolyte was 1.0 mass %.

(4) Fabrication of Nonaqueous Electrolyte Secondary Battery

Lead terminals were attached to the positive electrode (size: 30×40 mm) and the negative electrode (size: 32×42 mm). The positive electrode and the negative electrode were opposed to each other via a separator to form an electrode assembly. The separator used herein was a 20 μm thick microporous film made of polyethylene. The electrode assembly was inserted into an exterior case composed of an aluminum laminate film, and was vacuum dried at 105° C. for 2 hours. Thereafter, the nonaqueous electrolyte was poured, and the open end of the exterior case was sealed. A nonaqueous electrolyte secondary battery (design capacity: 50 mAh) was thus fabricated. The battery was charged in a 25° C. environment at a constant current of 0.2 It (10 mA) to a voltage of 4.2 V, and was thereafter charged at a constant voltage of 4.2 V until the current reached 0.02 It (1.0 mA). After the charging, the battery was allowed to rest for 20 minutes. After the rest, the battery was discharged in a 25° C. environment at a constant current of 0.2 It (10 mA) until the voltage reached 2.5 V. This charging and discharging cycle was repeated two times to stabilize the battery.

Comparative Example 1

A nonaqueous electrolyte secondary battery was fabricated in the same manner as in EXAMPLE 1, except that D-SUC was not added to the nonaqueous electrolyte.

Comparative Example 2

A nonaqueous electrolyte secondary battery was fabricated in the same manner as in EXAMPLE 1, except that FMP and FEA used in the preparation of the mixed solvent were replaced by ethyl methyl carbonate (EMC).

The batteries of EXAMPLE and COMPARATIVE EXAMPLES were evaluated in the following manner.

Evaluations (A) Initial Capacity

<Charging>

The battery was charged in a 25° C. environment at a constant current of 0.2 It (10 mA) to a voltage of 4.2 V, and was thereafter charged at a constant voltage of 4.2 V until the current reached 0.02 It (1.0 mA). After the charging, the battery was allowed to rest for 20 minutes.

<Discharging>

After the rest, the battery was discharged in a 25° C. environment at a constant current of 0.2 It (10 mA) until the voltage reached 2.5 V. The discharge capacity C1 (the initial capacity) was determined.

(B) Evaluation of High-Temperature Storage Characteristics

The same battery as fabricated above was provided separately and was charged in a 25° C. environment at a constant current of 0.2 It (10 mA) to a voltage of 4.2 V. Thereafter, the battery was stored in a 55° C. environment for 5 days. After the storage, the battery was allowed to stand in a 25° C. environment for 1 hour and was discharged under the same conditions as described in (A), thereby determining the discharge capacity C2. The capacity retention rate was calculated from the following equation.

Capacity retention rate (%)=(Discharge capacity $C2$/Discharge capacity $C1$)×100

Further, the battery was charged and discharged under the same conditions as described in (A), thereby determining the discharge capacity C3 (the recovered capacity). The capacity recovery rate was calculated from the following equation.

Capacity recovery rate (%)=(Discharge capacity $C3$/Discharge capacity $C1$)×100

The evaluation results are described in Table 1. In Table 1 and Tables 2 to 5 described later, the initial capacities are shown as indexes relative to the initial capacity of the battery of COMPARATIVE EXAMPLE 1 taken as 100, and the recovered capacities are as indexes relative to the recovered capacity of the battery of COMPARATIVE EXAMPLE 1 taken as 100. The values in parenthesis in the fluorinated chain carboxylate ester section in Table 1 indicate the volume proportions (%) in the nonaqueous solvent.

TABLE 1

| | Components in nonaqueous electrolyte | | Evaluations | | | |
|---|---|---|---|---|---|---|
| | Fluorinated chain carboxylate esters | Dicarbonyl compound | Initial capacity | Capacity retention rate (%) | Recovered capacity | Capacity recovery rate (%) |
| COMP. EX. 1 | FMP/FEA [40/40] | None | 100 | 89 | 100 | 92 |
| COMP. EX. 2 | None (EMC) | D-SUC | 102 | 88 | 99 | 91 |
| EX. 1 | FMP/FEA [40/40] | D-SUC | 102 | 94 | 102 | 96 |

The battery of EXAMPLE 1 which involved a nonaqueous electrolyte containing fluorinated chain carboxylate esters and a dicarbonyl compound had excellent high-temperature storage characteristics and attained a high capacity retention rate and a high capacity recovery rate.

The battery of COMPARATIVE EXAMPLE 1 which involved a nonaqueous electrolyte free from dicarbonyl compounds, and the battery of COMPARATIVE EXAMPLE 2 in which the nonaqueous electrolyte did not contain fluorinated chain carboxylate esters were poor in high-temperature storage characteristics, and the capacity retention rates and capacity recovery rates of these batteries were low.

Examples 2 to 4 and Comparative Examples 3 to 6

Nonaqueous electrolyte secondary batteries were fabricated and evaluated in the same manner as in EXAMPLE 1, except that D-SUC was replaced by the carbonyl compounds described in Table 2. In Table 2, SUC denotes succinic anhydride, DGA diglycolic anhydride, GLT glutaric anhydride, GBL γ-butyrolactone, MA methyl acetate, D-ADP dimethyl adipate, and CHDO 1,3-cyclohexanedione.

The evaluation results are described in Table 2.

TABLE 2

| | Component in nonaqueous electrolyte Carbonyl compound | Evaluations | | | |
|---|---|---|---|---|---|
| | | Initial capacity | Capacity retention rate (%) | Recovered capacity | Capacity recovery rate (%) |
| EX. 1 | D-SUC | 102 | 94 | 102 | 96 |
| EX. 2 | SUC | 102 | 93 | 103 | 95 |
| EX. 3 | DGA | 100 | 92 | 102 | 96 |
| EX. 4 | GLT | 102 | 93 | 102 | 95 |
| COMP. EX. 3 | GBL | 100 | 88 | 98 | 90 |
| COMP. EX. 4 | MA | 100 | 87 | 97 | 90 |
| COMP. EX. 5 | D-ADP | 99 | 88 | 99 | 92 |
| COMP. EX. 6 | CHDO | 97 | 84 | 95 | 88 |

The batteries of EXAMPLES 2 to 4 attained excellent high-temperature storage characteristics. COMPARATIVE EXAMPLES 3 and 4 in which monocarbonyl compounds GBL and MA were used resulted in poor high-temperature storage characteristics of the batteries. The battery of COMPARATIVE EXAMPLE 5, which used D-ADP having four carbon atoms between the two carbonyl groups, was unsatisfactory in high-temperature storage characteristics. COMPARATIVE EXAMPLE 6 in which CHDO had two carbonyl groups but was not an ester compound resulted in poor high-temperature storage characteristics of the battery.

Example 5

A nonaqueous electrolyte secondary battery was fabricated and evaluated in the same manner as in EXAMPLE 1, except that the mixed solvent of FEC, PC, FMP and FEA was replaced by a mixed solvent including FEC, PC and FMP in a volume ratio of 15:5:80.

Example 6

A nonaqueous electrolyte secondary battery was fabricated and evaluated in the same manner as in EXAMPLE 5, except that D-SUC was replaced by SUC.

Comparative Example 7

A nonaqueous electrolyte secondary battery was fabricated and evaluated in the same manner as in EXAMPLE 5, except that D-SUC was not added to the nonaqueous electrolyte.

The evaluation results are described in Table 3. The values in parenthesis in the fluorinated chain carboxylate ester section in Table 3 indicate the volume proportions (%) in the nonaqueous solvent.

TABLE 3

| | Components in nonaqueous electrolyte | | Evaluations | | | |
|---|---|---|---|---|---|---|
| | Fluorinated chain carboxylate esters | Dicarbonyl compound | Initial capacity | Capacity retention rate (%) | Recovered capacity | Capacity recovery rate (%) |
| COMP. EX. 1 | FMP/FEA [40/40] | None | 100 | 89 | 100 | 92 |
| COMP. EX. 7 | FMP [80] | None | 99 | 87 | 98 | 90 |
| EX. 1 | FMP/FEA [40/40] | D-SUC | 102 | 94 | 102 | 96 |
| EX. 5 | FMP [80] | D-SUC | 101 | 91 | 100 | 93 |
| EX. 6 | FMP [80] | SUC | 100 | 91 | 100 | 93 |

The batteries of EXAMPLES 5 and 6, which used FMP as the only fluorinated chain carboxylate ester, attained excellent high-temperature storage characteristics by virtue of the combined use of the fluorinated chain carboxylate ester with the dicarbonyl compound. In terms of high-temperature storage characteristics, the batteries of EXAMPLES 1 and 2 which involved FMP and FEA as the fluorinated chain carboxylate esters outperformed the batteries of EXAMPLES 5 and 6 which used FMP alone as the fluorinated chain carboxylate ester.

Example 7

A nonaqueous electrolyte secondary battery was fabricated and evaluated in the same manner as in EXAMPLE 1, except that LiPF$_6$ and LiFSI were used as the lithium salts in a molar ratio of 7:3.

Comparative Example 8

A nonaqueous electrolyte secondary battery was fabricated and evaluated in the same manner as in EXAMPLE 7, except that D-SUC was not added to the nonaqueous electrolyte.

Example 8

A nonaqueous electrolyte secondary battery was fabricated and evaluated in the same manner as in EXAMPLE 1, except that LiPF$_6$ and LiTFSI were used as the lithium salts in a molar ratio of 7:3.

Comparative Example 9

A nonaqueous electrolyte secondary battery was fabricated and evaluated in the same manner as in EXAMPLE 8, except that D-SUC was not added to the nonaqueous electrolyte.

The evaluation results are described in Table 4. The values in parenthesis in the lithium salt section in Table 4 indicate the molar ratios.

TABLE 4

| | Components in nonaqueous electrolyte | | Evaluations | | | |
|---|---|---|---|---|---|---|
| | Dicarbonyl compound | Lithium salts | Initial capacity | Capacity retention rate (%) | Recovered capacity | Capacity recovery rate (%) |
| COMP. EX. 1 | None | LiPF$_6$ | 100 | 89 | 100 | 92 |
| COMP. EX. 8 | None | LiPF$_6$/LiFSI [7/3] | 99 | 90 | 100 | 92 |
| COMP. EX. 9 | None | LiPF$_6$/LiTFSI [7/3] | 100 | 89 | 100 | 92 |
| EX. 1 | D-SUC | LiPF$_6$ | 102 | 94 | 102 | 96 |
| EX. 7 | D-SUC | LiPF$_6$/LiFSI [7/3] | 102 | 95 | 103 | 97 |
| EX. 8 | D-SUC | LiPF$_6$/LiTFSI [7/3] | 102 | 95 | 103 | 96 |

In EXAMPLES 7 and 8, LiPF$_6$ and LiFSI or LiTFSI were used as the lithium salts. Similarly in this case, the batteries attained excellent high-temperature storage characteristics by virtue of the use of the nonaqueous electrolyte including fluorinated chain carboxylate esters and a dicarbonyl compound.

Examples 9 and 10

Nonaqueous electrolyte secondary batteries were fabricated and evaluated in the same manner as in EXAMPLE 1, except that the content of D-SUC in the nonaqueous electrolyte was changed as shown in Table 5.

The evaluation results are described in Table 5.

TABLE 5

| | Content (mass %) of D-SUC in nonaqueous electrolyte | Evaluations | | | |
|---|---|---|---|---|---|
| | | Initial capacity | Capacity retention rate (%) | Recovered capacity | Capacity recovery rate (%) |
| COMP. Ex. 1 | 0 | 100 | 89 | 100 | 92 |
| EX. 1 | 0.5 | 102 | 94 | 102 | 96 |
| EX. 9 | 1.0 | 101 | 94 | 101 | 94 |
| EX. 10 | 1.5 | 100 | 92 | 100 | 93 |

The batteries of EXAMPLES 1, 9 and 10, in which the content of D-SUC in the nonaqueous electrolyte was 0.5 to 1.5 mass %, attained enhancements in high-temperature storage characteristics.

Example 11

A nonaqueous electrolyte secondary battery was fabricated and evaluated in the same manner as in EXAMPLE 1, except that CTFB was not added to the nonaqueous electrolyte.

The evaluation results are described in Table 6.

TABLE 6

| | Components in nonaqueous electrolyte | | | Evaluations | | | |
|---|---|---|---|---|---|---|---|
| | Fluorinated chain carboxylate esters | Dicarbonyl compound | Organic chlorine compound | Initial capacity | Capacity retention rate (%) | Recovered capacity | Capacity recovery rate (%) |
| EX. 1 | FMP/FEA [40/40] | D-SUC | CTFB | 102 | 94 | 102 | 96 |
| EX. 11 | FMP/FEA [40/40] | D-SUC | None | 102 | 94 | 101 | 95 |

The battery of EXAMPLE 11 achieved excellent high-temperature storage characteristics similarly to the battery of EXAMPLE 1. The capacity recovery rate was further increased by the addition of an organic chlorine compound.

INDUSTRIAL APPLICABILITY

The nonaqueous electrolyte secondary batteries according to the present invention are useful as main power supplies for such devices as mobile communication devices and portable electronic devices.

REFERENCE SIGNS LIST

1 NONAQUEOUS ELECTROLYTE SECONDARY BATTERY
10 WOUND ELECTRODE ASSEMBLY
11 PRISMATIC BATTERY CASE
12 SEALING PLATE
13 NEGATIVE ELECTRODE TERMINAL
14 POSITIVE ELECTRODE LEAD
15 NEGATIVE ELECTRODE LEAD
16 GASKET
17 PLUG
17a INJECTION HOLE
18 FRAME

The invention claimed is:

1. A nonaqueous electrolyte comprising:
a lithium salt and a nonaqueous solvent in which the lithium salt is dissolved,
wherein the nonaqueous solvent comprises a fluorinated chain carboxylate ester, a dicarbonyl compound having two carbonyl groups in the molecule, and an organic chlorine compound, and
the dicarbonyl compound is at least one selected from the group consisting of esters and acid anhydrides and has no atom or not more than three atoms between the two carbonyl groups, and
the organic chlorine compound has a structure represented by a general formula:

$CF_3CH_2CO-CClR_1R_2$ wherein $R_1$ and $R_2$ are each independently a hydrogen atom, a halogen atom, a C1-C2 alkyl group or a C1-C2 haloalkyl group.

2. The nonaqueous electrolyte according to claim 1, wherein the dicarbonyl compound has a chain molecular structure.

3. The nonaqueous electrolyte according to claim 1, wherein the fluorinated chain carboxylate ester comprises methyl 3,3,3-trifluoropropionate.

4. The nonaqueous electrolyte according to claim 1, wherein the fluorinated chain carboxylate ester comprises 2,2,2-trifluoroethyl acetate.

5. The nonaqueous electrolyte according to claim 1, wherein the content of the dicarbonyl compound in the nonaqueous electrolyte is 0.5 to 1.5 mass %.

6. The nonaqueous electrolyte according to claim 1, wherein the content of the fluorinated chain carboxylate ester in the nonaqueous solvent is not less than 20 vol % and not more than 90 vol %.

7. The nonaqueous electrolyte according to claim 1, wherein the lithium salt comprises a combination of $LiPF_6$ and either of $LiN(SO_2F)_2$ and $LiN(SO_2CF_3)_2$.

8. The nonaqueous electrolyte according to claim 1, wherein the dicarbonyl compound comprises at least one selected from the group consisting of oxalate monoesters, malonate monoesters, succinate monoesters, glutarate monoesters, diglycolate monoesters, oxalate diesters, malonate diesters, succinate diesters, glutarate diesters, diglycolate diesters, succinic anhydride, glutaric anhydride, and diglycolic anhydride.

9. A nonaqueous electrolyte secondary battery comprising:
the aqueous electrolyte described in claim 1, a positive electrode, and a negative electrode.

10. The nonaqueous electrolyte secondary battery according to claim 9,
wherein the positive electrode includes a Ni-containing lithium transition metal oxide.

11. The nonaqueous electrolyte according to claim 1, wherein the organic chlorine compound includes 1-chloro-1,4,4,4-tetrafluorobutan-2-one.

* * * * *